March 3, 1970   J. LEBLOND ET AL   3,498,555
APPARATUS FOR UNWINDING OR WINDING SPOOLS
Filed Aug. 7, 1968   3 Sheets-Sheet 1

INVENTORS
JEAN LEBLOND
JEAN BIET
BY Charles A. Blank
ATTORNEY

March 3, 1970  J. LEBLOND ET AL  3,498,555
APPARATUS FOR UNWINDING OR WINDING SPOOLS
Filed Aug. 7, 1968  3 Sheets-Sheet 3

INVENTORS
JEAN LEBLOND
BY JEAN BIET
Charles A. Blank
ATTORNEY

United States Patent Office
3,498,555
Patented Mar. 3, 1970

3,498,555
APPARATUS FOR UNWINDING OR
WINDING SPOOLS
Jean Leblond and Jean Biet, Compiegne, Oise, France, assignors to Uniroyal Englebert France S.A., Paris, France, a corporation of France
Filed Aug. 7, 1968, Ser. No. 750,994
Claims priority, application France, Aug. 10, 1967, 117,609
Int. Cl. B65h 23/18
U.S. Cl. 242—55         5 Claims

ABSTRACT OF THE DISCLOSURE

Apparatus for supplying tire fabric having a fabric let-off spool and a liner wind-up spool. Drive motor means are directly coupled to the end portions of the shafts of the spools, preferably by electromagnetic coupling means. The speed of the fabric let-off is controlled relative to a predetermined reference speed, and the speed of the liner wind-up is controlled relative to the speed of the let-off fabric.

---

The present invention relates to apparatus for the regulated unwinding and/or winding up of spools, especially those carrying material entering into the building of tire carcasses. The invention also relates to a supply unit or supply box with spools.

It happens fairly often that materials intended to be used or consumed at a certain place have to be brought there after being previously stored, by means of appropriate movable apparatus, and in quantities depending on the storage capacity and thus the dimensions of the apparatus. The removal of the stored materials to their place of use is achieved by the use of apparatus which may be placed at a fixed station suited to the storing apparatus, and to which the storing apparatus should be coupled in order to accomplish the removal and from which the storing apparatus should be uncoupled once the removal is achieved.

This is the case, for example, with materials presented in strip form, stored by winding up on spools at the place of production or storage, and which should be brought in this condition to the place of their use to be unwound there after the shafts of the spools have been lined up with and coupled to the drive shafts of the drive apparatus. The spools, once emptied of their contents, are uncoupled from the drive shafts to be replaced by new spools supplied with material.

The same case exists, moreover, at the production station where the empty spools should be driven in rotation around their axes to receive materials. The coupling between the shafts of the detachable spools and the drive shafts of the driving apparatus for the spools is achieved, in general, by the use of mechanical means for putting the spools into operation. Certain manipulations and certain equipment are ordinarily indispensable for the operation of the spools, which has the result not only of tying up manpower but also of tying up the apparatus using the stored material for a considerable period of time and, consequently, tying up the whole unit in the midst of which the apparatus interacts with other members.

Further, when a number of spools must be coupled with a number of drive shafts to be driven simultaneously and at rotational speeds variable with the extent of unwinding in such a way as to maintain a constant let-off speed of the strip, the drive apparatus must have members for controlling their rotational speed actuated by members integral with the spools to be driven. Moreover, the drive apparatus must ordinarily be coupled to such speed-control members by means which are the cause of an extra delay in the installation, often leading to disturbances in the continuity of the manufacturing cycle.

The present invention prevents these difficulties by supplying a device making it possible to couple a feed unit or box with unwinding and/or winding-up spools directly to a regulated fixed drive unit and without the involvement of intervening equipment.

One embodiment of apparatus according to the invention utilizes in combination: drive apparatus mounted on a fixed frame and the drive shafts of which are equipped at their ends with electromagnetically controlled plates; an electromagnetically controlled plate mounted on the fixed frame; apparatus, mounted on the fixed frame, for regulating the let-off speed of the material during winding up and/or unwinding; a movable feed frame or box for spools, on which there are mounted in fixed position spools whose axes in their operating positions coincide with the axes of the drive shafts and have at their ends plates of magnetizable material; a plate of magnetizable material mounted on the said movable frame, which in the operating position is applied onto the electromagnetically controlled plate mounted on the fixed frame.

Preferably the apparatus for regulating the let-off speed of the material comprises a drive shaft, and an arm which is movable under the influence of the material running off, interacting with a speed control for the corresponding drive shaft, or an arm whose movement is controlled by a runner connected with the movable frame and in contact with the last-mentioned arm.

The movable box has on its lower part guide bars interacting with the rails integral with the fixed frame. The movable box also has a brake block blocking the spools when the box is not coupled to the fixed frame. Further, the movable box has a plane of symmetry and may be coupled by either of its lateral faces to a suitable fixed frame.

Other characterstcs and advantages of the invention will be more evident from the following description with regard to the attached drawings in which.

Figure 1:
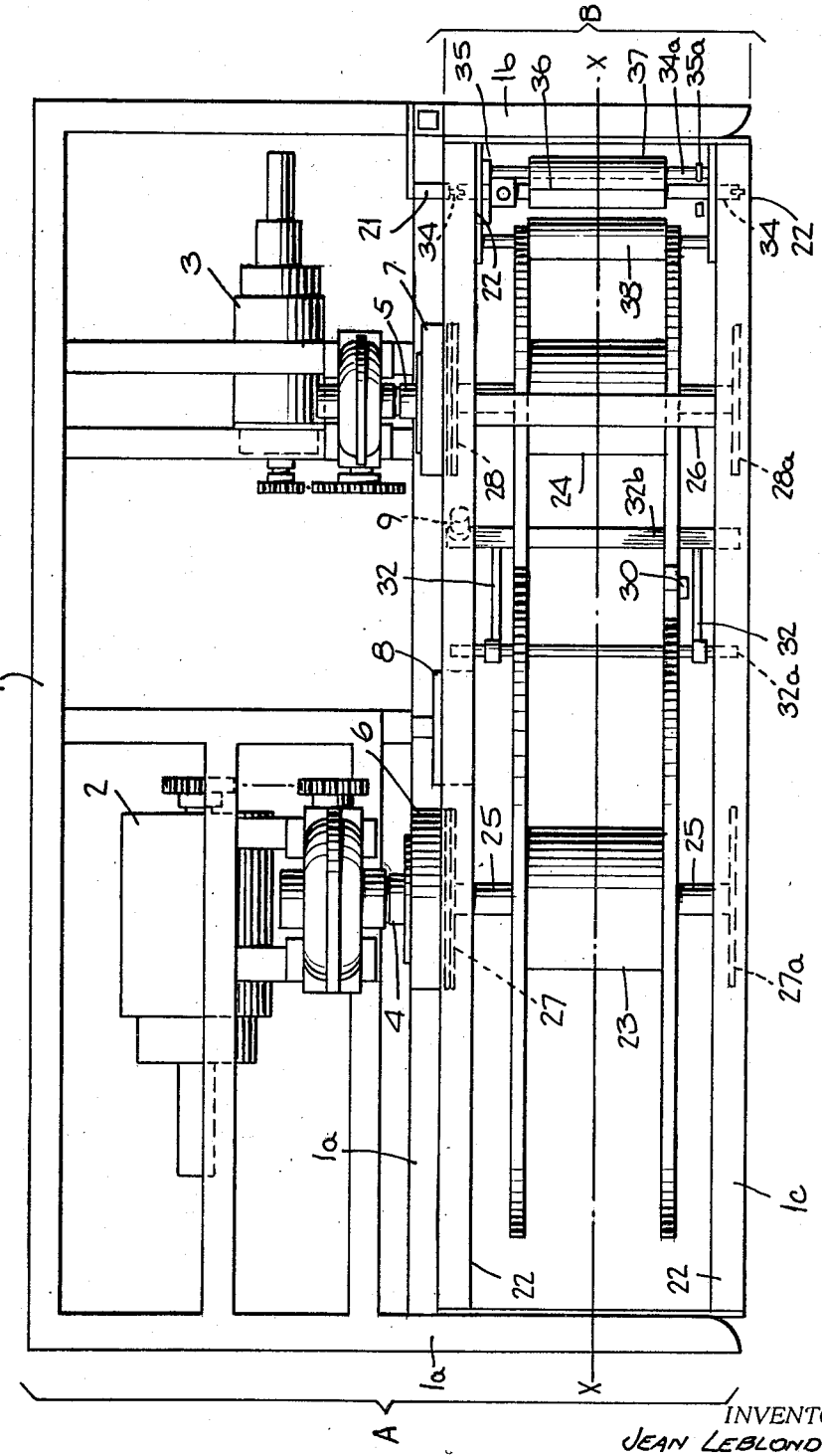
FIG. 1 is a plan view of a movable box according to the invention coupled with a drive and speed regulation unit.
Figure 2:
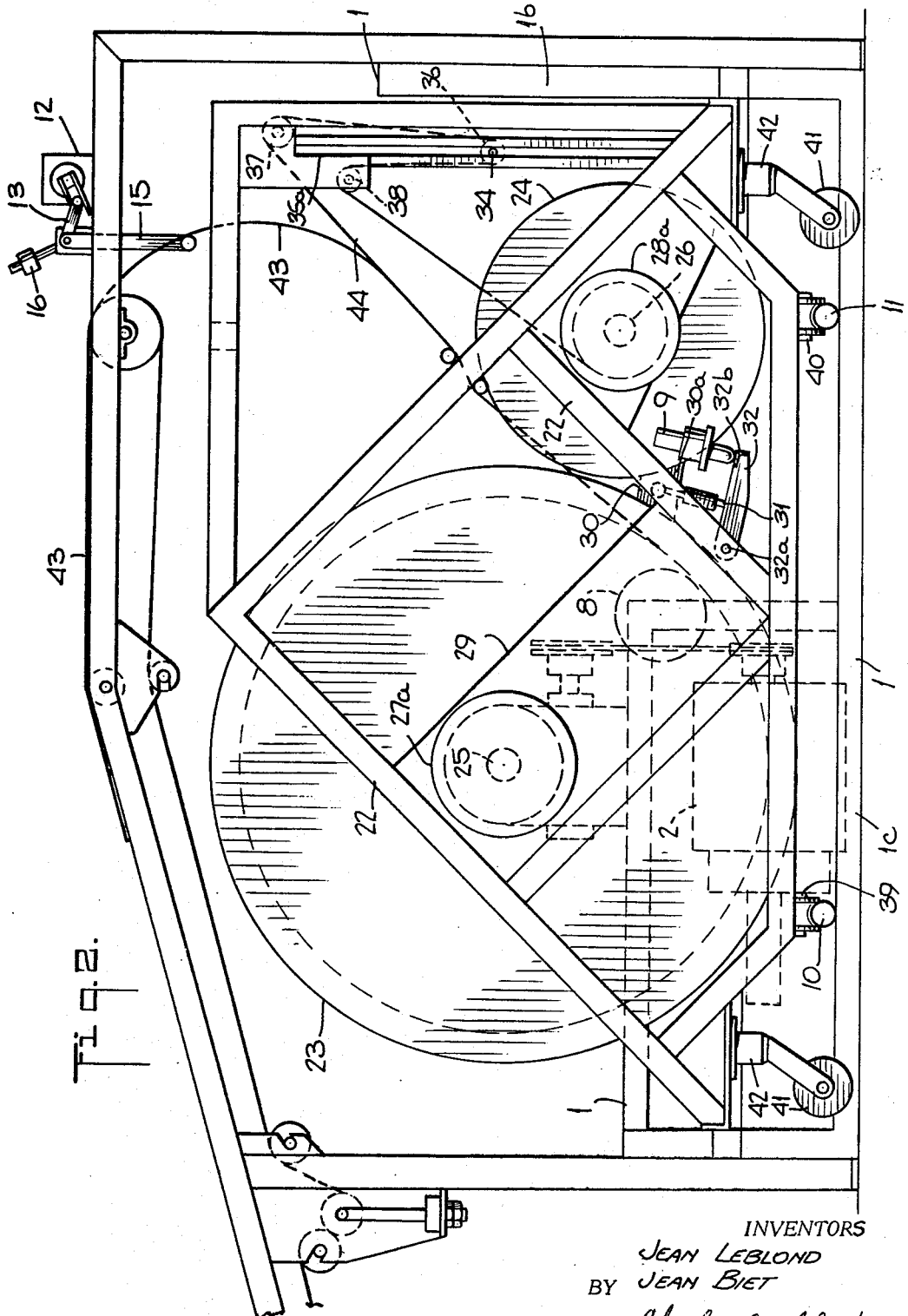
FIG. 2 is an elevational view of the members represented in figure including a conveyor T not shown in FIG. 1.
Figure 3:
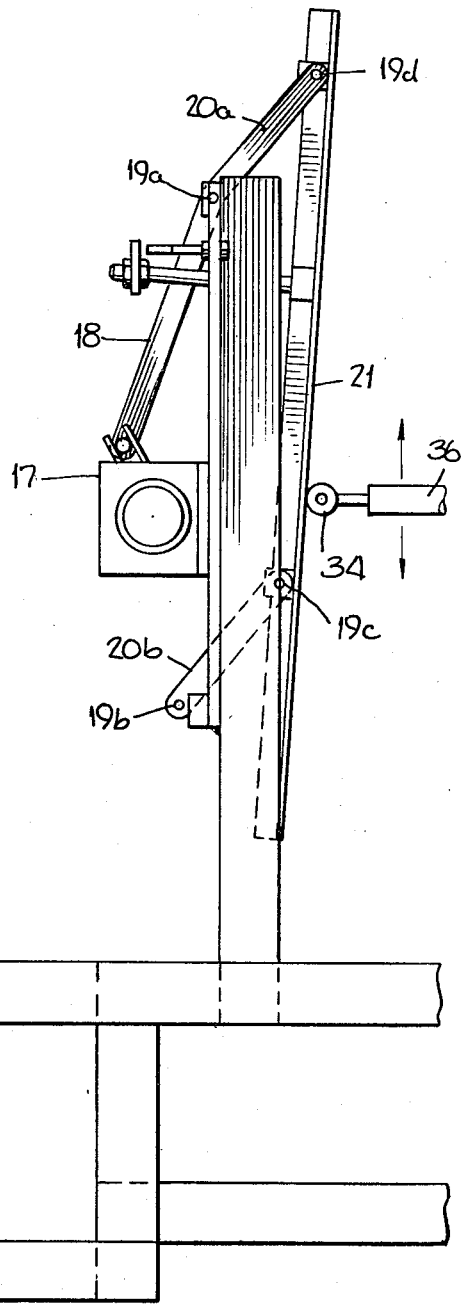
FIG. 3 is a detailed view to an enlarged scale, of a regulating member for the drive unit.

Referring to FIGS. 1, 2 and 3, there is represented a unit which puts into practice the device according to the invention and can be used, for example, to feed an apparatus for building and for applying plies or breaker strips going into the composition of tire carcasses. The unit interacts with the various apparatus of a group for building the carcasses and has a fixed part A, hereinafter called unwinding station and a detachable part B, hereinafter called box which in its operating position is coupled with the unwinding station. Associated with this unit through one of its ends is an apparatus for receiving the unwound strip, which may, for example, be an endless belt conveyor T interacting with the unwinding station and with the box for driving the unwound strip at a predetermined speed toward the member using it.

The unwinding station A has a fixed frame 1 on which the following members are mounted integrally: There are mounted on the fixed frame 1—two motor reducer units 2 and 3 whose drive shafts 4 and 5 end, respectively, and on the same side, in electromagnetically controlled plates 6 and 7 which are directly integral with the motor drive shafts. At least one fixed electromagnetically controlled plate 8 is placed on the same face of the frame 1 as the plates 6 and 7. A pneumatic or hydraulic jack 9 is also mounted on the frame 1.

Two lateral uprights 1a and 1b of the same length extend the frame from the side where the plates 6 and 7 are placed. Two guide bars or rails 10 and 11 supported by the lower member of the frame 1 extend it on the same side as the above lateral uprights 1a and 1b with the same length as these uprights 1a and 1b and parallel to the drive shafts 4 and 5.

As represented in FIG. 2, a member 12 is provided for controlling the speed of the motor reducer unit 2. The member 12 may be of a type known in itself, such as for example, a rheostat. This element 12 is actuated by a rod 13 which can rotate around the axis 14, driven integrally by the body of a crank 15 which may likewise rotate around this axis and is returned to its rest position by a counterpoise 16 which is integral with the crank 15. The crank 15 may be mounted either on the frame 1 or on a member of the conveyor T which is associated with it, as is shown in FIG. 2.

Referring to FIG. 3, there is represented a member 17 for controlling the speed of the motor reducer unit 3, of an essentially known type, such as, for example, a rheostat. This member is actuated by a rod 18 which can rotate around the axis 19a and is driven integrally by a rod 20a forming one of the sides of an articulated parallelogram. Two other sides of the parallelogram are constituted by a rod 20b parallel to rod 20a with the same length and articulated on the fixed axis 19b, and also by an arm 21 itself articulated on both the rods 20b and 20a by means of axis 19c and 19d. This articulated parallelogram at rest is situated in an equilibrium position determined both by the dead weight of the rods 20a and 20b and of the arm 21, and by the weight of the rod 18 which acts as a counterpoise. The unwinding station A also has a set of electrical and electropneumatic control elements of appropriate types, for controlling the motor reducer units 2 and 3, the jack 9 and the electromagnetic plates 6, 7 and 8, and making it possible to regulate the working of the above members to that of the conveyor T and to the passage of the strip on the said conveyor.

The box B has a frame 22 having a longitudinal plane of symmetry along the axis x—x on which are mounted in a fixed position the following elements, likewise all symmetrical with respect to the above plane of symmetry. Two spools 23 and 24 on the respective shafts 25 and 26 of which are mounted, at each of their ends, plates 27 and 27a and 28, 28a made of a ferromagnetic material such as, for example, steel. The plates 27, 27a and 28, 28a are, respectively, coaxial with the shafts 25 and 26. The plates 27, 27a, and 28, 28a, moreover can advantageously be replaced by collars made of the same material as the plates made integral with the shafts 25 and 26 through a flexible and strong diaphragm which is coaxial to the shafts 25, 26. The two spools 23 and 24 are mounted on the frame 22 in such a way as to be able to idle around their respective axes.

As represented in FIG. 2, the apparatus utilizes a plate 29 made of a ferromagnetic material, such as, steel.

At least one brake block 30 is in constant simultaneously through its two braking surfaces with each of the rims of the two spools, and is connected by means of a rod 31 to a lever arm 32 articulated on a fixed rod 32a parallel to the axes of the spools and integral with a bar 32b parallel to the said axes playing the part of a pedal. A compressible spring 33, integral at one end with the frame 22 and at the other end with the base of the brake block 30, supports the braking surfaces of the brake block on the rims of the spools when the box is not applied to the winding station and is compressed when the pedal 32b is pressed down to free the brake block.

A runner 34 with an axis parallel to the axes of the spools is movable between two vertical slides 35 and 35a and has a central part which, placed between the slides, serves as an axis of rotation for a tension roller 36 supported by the strip stored on the spool 24.

Two rollers 37 and 38 which are movable around fixed axes, parallel to the axes of the spools, are integral with the supports of the slides 35 and 35a and serve as return shafts to the strip stored on the spool 24.

Two slides 39 and 40 are fixed under the lower elements of the frame and parallel to the axes of the spools and equipped with rollers corresponding in shape to the rails 10 or 11. Four wheels 41 arranged in the four corners of the frame can be oriented in all the vertical planes by pivoting around a vertical axis 42 and are intended to facilitate the movements of the box during its positioning.

When the box is ready to be coupled to the unwinding station, and thus to be put in its position of use, the spool 23 has a load of a strip 43 wound up in a spiral on it from the hub of the spool. In order to prevent the different layers of this strip, consisting, for example, of a set of segments of wires or cords of parallel plies, arranged side by side and coated with rubber, from adhering to one another, they are separated by an interposed strip of fabric 44 wound up at the same time as the strip 43 on the spool 23, to be unwound at the same time as at the moment of the use of the spool 23 and at the same time wound up on the spool 24. The winding up of the interposed strip 44 on the spool 24 being previously started at the station for loading the box, the strip then passes successively around the rollers 38, 36 and 37 mentioned above.

In this condition, the box which rests on its wheels is ready to be coupled at the unwinding station. This coupling is achieved in a simple, rapid way in the following manner. On the wheels 41 the box is brought opposite the unwinding station in such a way that the slides 39 and 40 are respectively facing the rails 10 and 11 of the unwinding station. It is then sufficient to shove the box for the rollers to engage and then to roll on the rails and guide the box until the elements of the latter and those of the unwinding station corresponding to them come in contact. When this operation has been carried out, the box rests through the rollers of the slides 39 and 40 on the rails 10 and 11 of the unwinding station and is enclosed between the uprights 1a and 1b of the unwinding station. The end plate 27 of the shaft 25 of the spool 23 is applied against the end electromagnetic plate 6 of the drive shaft 4 and in such a way that the axes of the shafts coincide. The end plate 28 of the shaft 26 of the spool 24 is applied against the end electromagnetic plate 7 of the drive shaft 5 in such a way that the axes of the shafts coincide.

The plate 29 of the box is applied against the electromagnetic plate 8. The end of the rod of the jack 9 is placed in contact with the pedal 32b. The end of the runner 34 comes to rest on the control arm 21. When this position is reached, the end of the strip 43 is brought onto the upperside of the endless belt of the conveyor T after having been passed on the sleeve of the crank 15 as shown in FIG. 1.

The different elements of the unwinding station may be controlled from contacts actuated by buttons assembled together on the same control panel fixed on the station. Under these conditions, when the appropriate contact is actuated by the use of the corresponding button; electromagnetic plates 6, 7 and 8 controlled by an electric current become the seat of a magnetic field which has the effect of making the plates or collars 27 and 28 and the plate 29 integral with them in such a way that the frames 1 and 22 become integral with one another. Thus, if the drive shafts 4 and 5 are caused to be driven in rotation, by the same fact that shafts 25 and 26 of the spools 23 and 24 are driven in rotation. At the same time the rod of the jack 9, put under pressure through the magnetic valve controlled by the above-mentioned contact, pushes the pedal and releases the brake block, unblocking the spools 23 and 24 which thus become ready to be set in rotation.

This first contact, once established in the control circuit, makes it possible through a button placed on the control panel to establish the contact controlling simultaneously the action of the motor reducer units 2 and 3 and of the motor reducer drive unit of the conveyor T. The latter, driven at a constant predetermined speed, drives the strip 43 whose end has been placed in contact with it at the same constant speed. This implies that during the unrolling of the strip, the speed of rotation of the unwinding spool 23 should increase, while the rotation speed of the spool 24 which, on the contrary, is winding up the strip of interposed material at the same time should decrease. This assumes that in the first case the diameter occupied on the spool by the strip during unwinding decreases, and that in the second case the diameter occupied on the spool by the strip during winding up increases. The variations in speed thus made necessary are obtained through the regulating elements 12 and 17.

When the unwinding spool 23 has a tendency to rotate at too low a speed to keep the runoff speed of the strip on the conveyor T constant, the tension on the side of the strip situated between the spool and conveyor has a tendency to increase, which has the effect of causing the crank 15 to turn in the clockwise direction (in the case of FIG. 1) and to actuate the rheostat 12 in such a way that the rotation speed of the motor reducer 2 increases. Similarly, when the spool 23 has a tendency to turn too rapidly, under the influence of the decrease in tension of the side of the strip mentioned above, the crank 15 is brought back by its counterpoise, thus actuating the rheostat to cause a slowing down of the motor reducer unit. Thus, the unwinding speed of the spool is constantly adapted to the runoff speed of strip on the conveyor.

Referring now to FIGS. 1 and 3, when the spool 24 has a tendency to rotate too slowly with respect to the unwinding speed of the strip 43, this variation in relative speed causes a decrease in the tension of the side of the interposed strip which is situated between the point where it separates from the strip 43 and the point where it makes contact with the part already wound up, after moving in succession over the rollers 37, 36 and 38. Consequently, the roller 36, which is vertically movable between the walls of the slides 35 and 35a, shifts downward. The runner 34 whose end in contact with the arm 21 of the articulated parallelogram then shifts on the same vertical line, thus forcing the arm to shift parallel to it, and consequently the rod 20a to rotate around the axis 19a, and the rod 18 to actuate the rheostat 17 to cause an increase in the rotation speed of the motor reducer unit 3 and thus an increase in the winding-up speed of the spool 24. The same process occurs in the opposite sense when, instead of decreasing, the winding-up speed of the spool 24 increases, which, jointly with the rotation speed of the spool 23, controls the tension of the side of the interposed strip, a tension whose variations are reflected in the level of the movable roller 36, and is thus constantly regulated as a function of the runoff speed given to the strip 43 on the conveyor T. The speeds of the different winding-up and unwinding elements are thus regulated constantly in such a way that the runoff speed of the unwound strip retains the predetermined constant value imposed on it by the conveyor T.

When the total contents of the spool 23 have been removed and, consequently, the part of the interposed strip 44 involved has been wound up on the spool 25, the box should be separated from the unwinding station and replaced by a new box supplied with strip. Here too the uncoupling is achieved simply and rapidly in the following manner. A contact actuated by a button placed on the control panel makes it possible to interrupt the passage of the current through the control circuits. This interruption of the passage of the current has the effect of demagnetizing the different electromagnetic plates, and thus of instantaneously making the drive shafts no longer integral with the shafts of the spools and the frame 1 and of actuating the magnatic valve controlling the jack 9. In returning to its rest position the jack 9 releases the spring controlling the brake block 30 which then blocks the spools. The box can be withdrawn immediately by causing it to roll on the rails 11 and 12 of the unwinding station, which then becomes ready to receive a new loaded box immediately.

As FIG. 1 indicates, the unwinding of the strip 43 is achieved in the direction corresponding at the unwinding station to going from the motor reducer unit 3 in the direction of the motor reducer unit 2. If the strip 43 must be unwound in the opposite direction, this should be done with the aid of an unwinding station in which the direction running from unit 3 to unit 2 is opposite to the direction shown in FIGURE 1. By reason of the symmetry of the box and of all its elements with respect to its medium longitudinal plane, it is not necessary to have a box suitable for each run-off direction of the unwound strip. In fact, by turning around a vertical axis, that is, by a simple half turn (180° turn) the box may be fitted to an unwinding station provided for the run-off of the strip in a direction opposite to that shown in FIGURE 1 and be coupled there as stated above.

As in any mechanical system, a slight play may exist between certain members of the box and of the unwinding station, especially between the guide rails of the latter and the corresponding slides of the box. This play is manifested by the fact that the axes of the drive shafts do not coincide exactly with those of the corresponding spools when the coupling is achieved. This is why the ends of the shafts of the spools are provided with annular plates coaxial to these shafts and united with them by a sufficiently flexible and strong diaphragm which makes it possible to absorb, during their driving in rotation, the slight errors in alignment between the axes.

What has been said above with regard to the unwinding of a loaded box by an unwinding station naturally applies point by point to the case of a box emptied of its load and before being reloaded. A winding station, that is a station making it possible to wind up a strip on the spool 23 and the interposed strip on the spool 23, or to unwind it starting from the spool 24, is a station identical to the unwinding station described above but one whose different members rotate in an opposite direction to the corresponding members of the said unwinding station. Thus, a box may be coupled to such a winding station with the aim of reloading the spool, in a similar manner and under similar conditions as those indicated above. Thus, the device which has just been described makes it quite possible to couple a box with unwinding and/or winding-up spools, almost instantaneously and without the use of additional equipment, to a drive station, making possible the immediate and automatic operation of the assembly thus achieved.

While there has been described what is at present considered to be the preferred embodiment of this invention, it will be obvious to those skilled in the art that various changes and modifications may be made therein without departing from the invention, and it is, therefore, aimed to cover all such changes and modifications as fall within the true spirit and scope of the invention.

Having thus described our invention, what we claim to protect by Letters Patent is:

1. Apparatus for supplying tire fabric comprising:
   a tire fabric let-off unit comprising a rotatable shaft having a rotatable roll of tire fabric thereon, said tire fabric let-off unit also supporting a liner fabric between layers of said tire fabric;

first motor means having a drive shaft for rotating said shaft of said fabric let-off unit, said roll of tire fabric, and said liner fabric;

first coupling means for coupling said drive shaft of said first motor means to an end portion of said shaft of said tire fabric let-off unit;

a wind-up spool for said liner fabric, said spool having a rotatable shaft;

second motor means having a drive shaft for rotating said wind-up spool to wind up said liner fabric;

second coupling means for coupling said drive shaft of said second motor means to an end portion of said shaft of said wind-up spool;

means for controlling the rotational speed of said first motor means in accordance with the speed of the let-off tire fabric relative to a predetermined reference speed;

means for controlling the rotational speed of said second motor means in accordance with the speed of the liner wind-up relative to the speed of the let-off tire fabric.

2. Apparatus in accordance with claim 1 which includes a fixed frame and which includes means for coupling said let-off unit to said fixed frame.

3. Apparatus in accordance with claim 1 in which said first and second coupling means each include magnetizable members mounted on the respective shafts of said let-off unit and said wind-up spool and magnetic means mounted on the respective drive shafts of said first and second motor means.

4. Apparatus in accordance with claim 3 in which said magnetic means are electromagnetic means.

5. Apparatus in accordance with claim 1 in which said tire fabric is tire breaker fabric.

References Cited

UNITED STATES PATENTS

| 2,354,952 | 8/1944 | Hornbostel | 242—75 |
| 2,668,572 | 2/1954 | Bostwick | 242—67.3 X |
| 3,012,735 | 12/1961 | Nebout | 242—67.3 |
| 3,044,727 | 7/1962 | Holroyd et al. | 242—67.3 |

LEONARD D. CHRISTIAN, Primary Examiner

U.S. Cl. X.R.

242—67.3, 75.51